(12) United States Patent
Eck et al.

(10) Patent No.: US 10,970,648 B2
(45) Date of Patent: *Apr. 6, 2021

(54) MACHINE LEARNING FOR TIME SERIES USING SEMANTIC AND TIME SERIES DATA

(71) Applicant: International Business Machines Corporation, Armonk, NY (US)

(72) Inventors: Bradley Eck, Carpenterstown (IE); Vincent Lonij, Phoenix Park Racecourse (IE); Pascal Pompey, Nanterre (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 843 days.

This patent is subject to a terminal disclaimer.

(21) Appl. No.: 15/690,753

(22) Filed: Aug. 30, 2017

(65) Prior Publication Data

US 2019/0065988 A1 Feb. 28, 2019

(51) Int. Cl.
*G06N 20/20* (2019.01)
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC ........ G06N 20/00; G06N 5/04; G06N 3/0472; G06N 7/005; G06N 5/022; G06Q 10/06; G06Q 10/08
See application file for complete search history.

(56) References Cited

U.S. PATENT DOCUMENTS

| 8,874,432 B2 | 10/2014 | Qi et al. |
| 9,336,495 B2 | 5/2016 | Bai et al. |

(Continued)

FOREIGN PATENT DOCUMENTS

| WO | 2007140386 A2 | 12/2007 |
| WO | 2009096523 A1 | 8/2009 |
| WO | 2015053774 A1 | 4/2015 |

OTHER PUBLICATIONS

Mahapatra et al. ("Contextual Anomaly Detection in Text Data"), Oct. 19, 2012 (Year: 2012).*

(Continued)

*Primary Examiner* — Kamran Afshar
*Assistant Examiner* — Imad Kassim
(74) *Attorney, Agent, or Firm* — Amin, Turocy & Watson, LLP

(57) ABSTRACT

Techniques that facilitate semantic and time series analysis using machine learning are provided. In one example, a system includes a data analysis component, a prediction component and a learning component. The data analysis component that establishes one or more relationships between one or more elements of semantic data, including one or more time series identifiers, and one or more elements of time series data in a relationship database. The prediction component generates one or more advisory outputs, wherein generation of the one or more advisory outputs is performed in response to a trigger event, a learning component that determines the one or more relationships in the relationship database, wherein determination of the one or more relationships is based on information indicative of whether the advisory outputs satisfy a defined criterion.

9 Claims, 11 Drawing Sheets

(56) References Cited

U.S. PATENT DOCUMENTS

| | | | |
|---|---|---|---|
| 2010/0049538 A1* | 2/2010 | Frazer | G06Q 30/02 |
| | | | 705/14.4 |
| 2010/0318526 A1 | 12/2010 | Nakazawa et al. | |
| 2011/0264665 A1 | 10/2011 | Mital et al. | |
| 2011/0270604 A1 | 11/2011 | Qi et al. | |
| 2015/0254330 A1 | 9/2015 | Chan et al. | |
| 2015/0339351 A1 | 11/2015 | Swan et al. | |
| 2016/0154836 A1 | 6/2016 | Swan et al. | |
| 2017/0346841 A1* | 11/2017 | Jaidka | G06F 16/3344 |

OTHER PUBLICATIONS

List of IBM Patents and Applications Treated as Related.

Author Unknown, "Automated Data Exploration and Validation," U.S. Appl. No. 15/405,607, filed Jan. 13, 2017, 50 pages.

Keogh, et al., "An Augmented Visual Query Mechanism for Finding Patterns in Time Series Data," Last Accessed: May 23, 2017, 11 pages.

Bach, et al., "A Review of Relation Extraction," Last Accessed: May 23, 2017, 15 pages.

Reiter, et al., "Choosing words in computer-generated weather forecasts," Available online Aug. 15, 2005, 33 pages.

Yu, et al., "Choosing the content of textual summaries of large time-series data sets," Natural Language Engineering, 2006 Cambridge University Press, 25 pages.

Non-Final Office Action received for U.S. Appl. No. 15/842,501 dated Aug. 4, 2020, 72 pages.

* cited by examiner

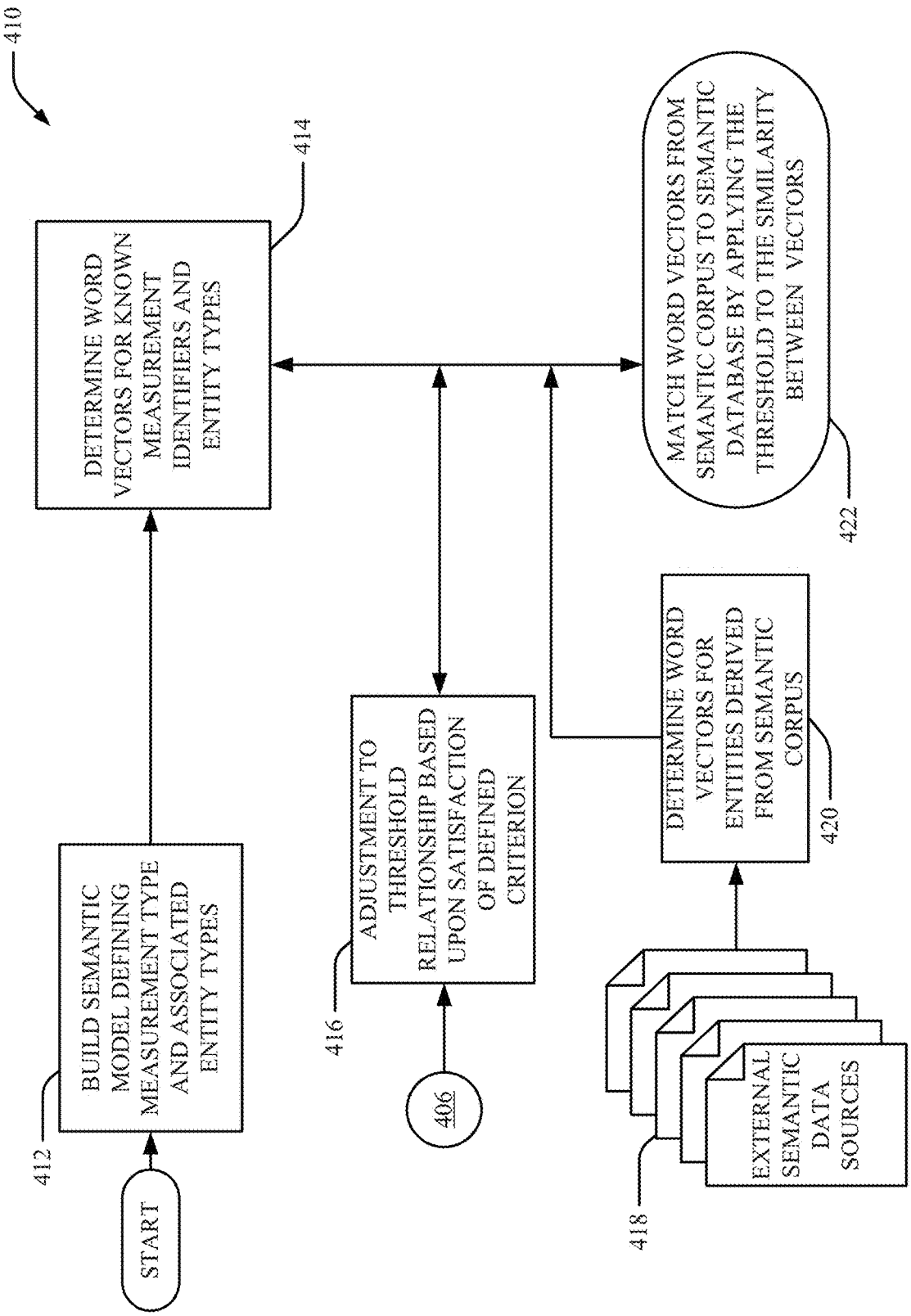

US 10,970,648 B2

MACHINE LEARNING FOR TIME SERIES USING SEMANTIC AND TIME SERIES DATA

BACKGROUND

The subject disclosure relates to machine learning, and more specifically, to machine learning using semantic and time series data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate machine learning using time series and semantic data are described.

According to an embodiment, a system can comprise an analysis component, a prediction component, and a learning component. The analysis component can establish one or more relationships between one or more elements of semantic data, including one or more time series identifiers, and one ore more elements of time series data in a relationship database. The prediction component can generate one or more advisory outputs, where the generation is performed in response to a trigger event. The learning component can determine the one or more relationships in the relationship database. The determination of the one or more relationships is based on information indicative of whether the advisory outputs satisfy a defined criterion.

According to another embodiment, a computer-implemented method is provided. The computer-implemented method can comprise establishing, by a system operatively coupled to a processor, one or more relationships between one or more elements of semantic data including one or more time series identifiers and one or more elements of time series data in a relationship database. Furthermore, the computer-implemented method can comprise generating, by the system, an advisory output in response to a trigger event. determining, by the system, the one or more relationships in the relationship database, wherein determination of the one or more relationships is based on information indicative of whether the advisory output satisfies a defined criterion.

According to yet another embodiment, a computer program product facilitating machine learning can comprise a computer readable storage medium having program instructions embodied therewith. The program instructions can be executable by a processor and cause the processor to establish, by the processor, one or more relationships between one or more elements of semantic data and one or more time series data in a relationship database. The program instructions can also cause the processor to generate, by the processor an advisory output in response to a trigger event. Furthermore, the program instructions can also cause the processor to determine, by the processor the one or more relationships in the relationship database based on information indicative of whether the advisory output satisfies a defined criterion.

DESCRIPTION OF THE DRAWINGS

FIG. 4A illustrates a block diagram of an example, non-limiting system that can facilitate association of semantic entities in accordance with one or more embodiments herein.

DETAILED DESCRIPTION

Figure 1:
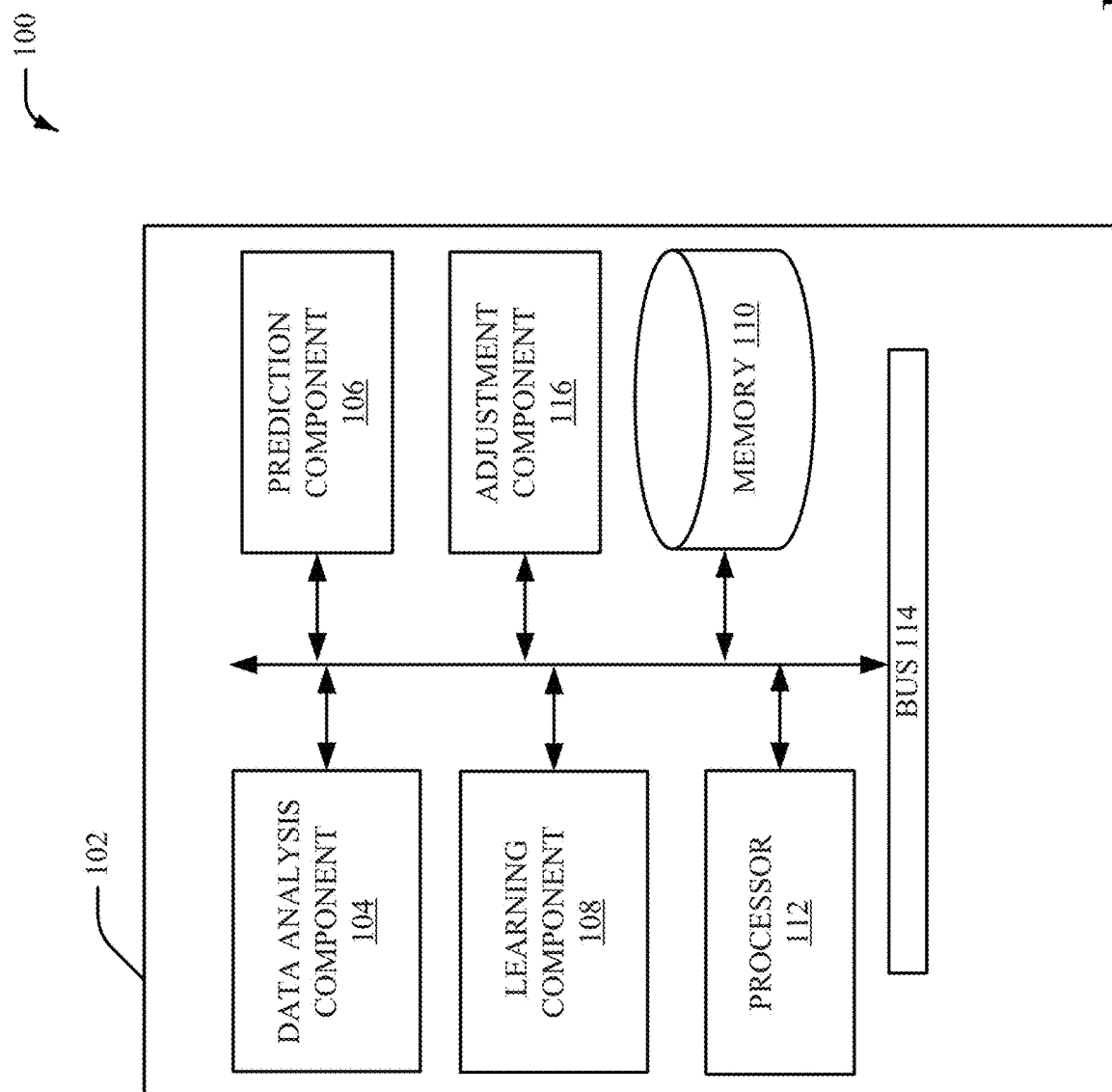
FIG. 1 illustrates a block diagram of an example, non-limiting system to facilitate machine learning using semantic and time series data in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning can be employed by numerous technologies to determine inferences and/or relationships among digital data. For example, machine learning technologies, signal processing technologies, image processing technologies, data analysis technologies and/or other technologies can employ machine learning models to analyze digital data, process digital data, determine inferences from digital data and/or determine relationships among digital data. Oftentimes digital data is formatted as time series data, but also, critical domain information can found in the various forms of semantic data. Time series data can be a sequence of data that is repeatedly generated and/or captured by a device (e.g., a computing device) at a plurality of time values during a certain time interval. Semantic data can be written or spoken communication in the form of emails, instant messages, operator logs, production logs, patient logs, free-form comments in database entries, transcribed phone calls, transcribed teleconferences, paper versions of documents that can be translated by various forms of character recognition, or translations of those documents therein. Drawing conclusions as to the nature of relationships when these two data types intertwine, and more specifically, when the presence of one indicates a trend or anomaly in another, is often a much more subtle relationship and generally unrecognizable by current machine learning systems.

Embodiments described herein include systems, computer-implemented methods, and computer program products that facilitate machine learning process using time series data and semantic data. For example, learning of relationships between text entities and one or more time series patterns can be accomplished using various methods for quantifying semantic data. Embodiments detailed herein use the example word embedding method Word2Vec, however any number of methods may be used for this end, including, but not limited to, generic language or feature modeling, alternate neural-linguistic programming (NLP) algorithms, dimensionality reduction, probabilistic modeling, neural language explicit representation, latent semantic analysis, latent semantic mapping, or explicit semantic analysis. In one or more embodiments, a system for machine learning using semantic and time-series data is employed to continually monitor one or more operations environments and in response to a measurement of time series data that is determined to be anomalous, generate one or more output responses to be evaluated by a defined criterion.

In another embodiment, a non-limiting system can utilize a machine learning process using time series and semantic data is used to monitor one or more streams of time series data in various operating environments and, in response to a natural language message, can generate one or more output responses to be evaluated by a defined criterion. As used herein, a defined criterion can be considered whether an advisory output has a defined level of accuracy. If the level of accuracy of the advisory output is determined to exceed a threshold value, then the relationship database is updated in some embodiments. In one or more embodiments, examples of advisory outputs can be or include information indicative of advisory outputs associated with: diagnosis of illness, component failure, live display of time series data for generating diagnoses, and/or work orders generated to address and/or prevent future failure of a component, part, organ or the like.

In an aspect, this natural language message could be written communication over a network, containing one or more semantic entities denoting a trigger event which causes the system to generate an output response similarly to a time series data induced response outlined above. This natural language message can also be an error code, recognized by the system, for example, as a series of characters meant to indicate a particular state of instability in the external operating environment. It is worth noting that key to multiple embodiments detailed further, is the ability to recognize natural language messages with respect to their context within an operating environment is advanced considerably by the system's ability to establish relationships between semantic entities, time series measurements, and semantic elements characterized as time series identifiers. As a nominal measurement example, "temperature" may be given in degrees, that measurement may have one or more identifiers that can include its explicit title "temperature" but may also include "heat", or "warmth". Relationships between these identifiers and other semantic entities form a key component of the machine learning system herein, and particularly the ability of the system to operate in response to natural language messages. For simplicity of reference in further discussions of the subject disclosure, the term "semantic entity" is to be considered, in a way of thinking, external the realm of formal computing language, and dissimilar to processes followed by a computer when executing programming instructions in a specific language. Instead, the term "semantic entity" is used here to describe any element of written or spoken language, captured, stored, or transferred via various mediums and platforms. Sources of these entities are to be considered to include, but not be limited to written or spoken communication in the form of emails, instant messages, operator logs, production logs, patient logs, freeform comments in database entries, transcribed phone calls, transcribed teleconferences, paper versions of documents that can be translated by various forms of character recognition, or translations of those documents therein. Entities can be words, phrases, characters, and any grouping of these elements found within any of these sources. In an embodiment, groupings of such entities, either time series or semantic, are analyzed together as a singular entity for the establishment of relationships between that grouping or "cluster" and one or more elements of time series or semantic data. Understanding the nature of these entities and their sources is of prime importance when discerning further the causal relationship between the natural language messages they can comprise and the subsequent output responses. An output response to any one or more of these messages can be a written course of action, detailing one or more steps to be performed in order to correct a defect or return conditions in the external environment to normal. It can also be one or more live or historical displays of time-series data relevant to the type of trigger event recognized by the system. In an aspect, an output response can also be a work notification, generated to indicate the need for part replacement, preventative maintenance, lubrication, equipment teardown and sanitation, prescription order, emergency procedure, or any other maintenance activities within the relevant operating environments.

FIG. 1 illustrates a block diagram of an example, non-limiting system 100 that facilitates machine learning using time series and semantic data in accordance with one or more embodiments described herein. In various embodiments, the system 100 can be a machine learning system employed in environments such as, but not limited to, power supply environments, manufacturing environments, healthcare or hospital environments, or stock exchange environments. The system 100 can employ hardware and/or software to solve problems (e.g., that are highly technical in nature, that are not abstract and that cannot be performed as a set of mental acts by a human. Further, some of the processes performed may be performed by one or more specialized computers (e.g., one or more specialized processing units, a specialized computer with a time series data component, etc.) for carrying out defined tasks related to machine learning. The system 100 and/or components of the system can be employed to solve new problems that arise such as a loss of domain knowledge, particularly when the environment in which the system is employed undergoes a continual change in the way of system upgrades or personnel turnover. One or more embodiments of the system 100 can provide technical improvements to environments such as continual manufacturing environments, healthcare environments, power supply environments, public utility environments, transit systems, air traffic control systems, maintenance scheduling systems, among various other environments of use.

In the embodiment shown in FIG. 1, the system 102 can include a data analysis component 104. Aspects of the data analysis component 104 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the system 102 can also include memory 110 that stores computer executable components and instructions. Furthermore, the system 102 can include a processor 112 to facilitate execution of the instructions (e.g., computer executable components and corresponding instructions) by the system 102. As shown, the data analysis component 104, the prediction component 106, the learning component 108, the adjustment component 116, the memory 110, the bus 114, and/or the processor 112 can be electrically and/or communicatively coupled to one another in one or more embodiments.

The data analysis component 104 can generate one or more relationships between data entities. In one example, these entities can be time series data, a cluster of time series measurement identifiers, and/or semantic data. As used herein, "time series data" can be a sequence of data that is repeatedly generated and/or captured at a plurality of time values during a certain time interval. In an aspect, the time series data can be raw time series data (e.g., unprocessed time series data). Similarly, time series data can include characteristics of raw elements of time series data that such as a median, mode, maximum, standard deviation, or sum. This list is not meant to be fully comprehensive but rather a mere sampling of the derivations of raw elements that can be characterized by the term "time series data". The model, or relationship database 206 established by data analysis component 104 can be trained to understand any number of relationships between semantic and or time series entities external to its exact area of implementation. For example, a newly introduced system 100 implemented in, for example, a health care environment may receive an input in the form of a natural language message that contains a reference to "elevated chance of stroke" and use relationships previously generated by data analysis component 104 to refer to time series identifiers such as blood pressure, blood solute levels, or retrieval of relevant cranial images taken based upon any anatomical or physiological relationships established based upon entity relationships. In one or more embodiments, the data analysis component 104 can establish relationships in the relationship database 206 in response to data received in the immediate environment of implementation as well as external data entities on which a semantic data model 414 has been trained prior to implementation.

In some embodiments, the relationships comprising relationship database 206 can be established between various combinations of data. For example, the data analysis component can establish relationships between semantic data entities. In an aspect, data analysis component 104 can establish relationships between an entity of semantic data and a time series data. In an embodiment, clusters of 2 or more entities of either data type of data can be analyzed by data analysis component 104 and a relationship established between the cluster and one or more semantic or time series entities.

The example method for quantifying semantic entities by data analysis component 104 assigns to one or more (or, in some embodiments, each) semantic data entities a vector space in a matrix comprised of a plurality of dimensions. The calculated distance between assigned vectors, corresponding to, for example, frequency and/or degree of proximity of the data elements as they appear in their respective environments, corresponds directly in the establishment of a variable threshold value of the relationship by the data analysis component 104.

It is to be understood that the use of "proximity" in the context of elements of data is relative to the nature of a particular relationship. For example, proximity of patterns within a time series data stream with respect to a semantic entity can be the length of time between a semantic entity's appearance in the operating environment and the emergence of a corresponding pattern in a time series data stream. Conversely, proximity of two or more semantic data entities can be conceptually thought of as the distance, or number of words separating those two entities in documents or correspondence. Not dissimilar from the first example, however, time can be a relative measure of proximity for semantic entities such as time series identifiers contained in multiple but separate correspondences. For example, separate uses of one or more identifiers in a relatively short time period could strengthen the variable threshold value of a relationship between those entities. In summary, proximity is meant to be a non-limiting term used to describe various entity relationships throughout the description of the subject disclosure.

The prediction component 106 can monitor corpus of semantic data 202 and time series data 206 and in response to detecting a trigger event (e.g., time series data determined to be anomalous, an alarm message, or various natural language messages) generate an advisory output 404. The advisory output 404 can be output to various devices (e.g., human machine interface, computer monitor, or PDA) in various forms (e.g., emailed alert, visually displayed treatment regimen, step-by-step instructions detailing a suggested course of action). The purpose of the advisory output 404 is to bridge a knowledge gap that can exist when the desired correct response to a trigger event might exist in domain knowledge owned by a subject matter expert. This subject matter expert can be inaccessible at the event onset, and in some cases, timely and appropriate action can prevent substantial loss (e.g., process downtime, human loss, damage to operating equipment, or incremental maintenance costs).

In an aspect, prediction component 106 can monitor the aforementioned corpus and based upon learned relationships integrated into the relationship database 206 by the data analysis component 104, generate an advisory output 404. As such, the prediction component 106 can be operatively coupled to the relationship database and the environment adding new data to a corpus comprised of semantic data 202 and time series data 204. These elements will be discussed in more detail in FIG. 4 and FIG. 4A.

The learning component 108 can determine the one or more relationships in the relationship database established by the data analysis component 104. Determination of the one or more relationships is based on information indicative of whether advisory outputs generated by the prediction component 106 satisfy a defined criterion (e.g., a threshold measure of accuracy or another condition related to the level of accuracy). As an introduction to the process of criterion evaluation in system 100 and other embodiments, in short, relevance of the advisory output 404 generated by a prediction component 106 in response to a trigger event can be measured based upon user related data. In one or more embodiments the learning component 108 can be operatively coupled to adjustment component 116, data analysis component 104 and relationship database 206. The relevant operations of these elements to warrant such reference will be described in more detail in later descriptions of FIG. 2 and FIG. 4.

The adjustment component 116 can adjust, based upon a defined criterion evaluation 406, a variable threshold value of the one or more relationships in relationship database 206. In this manner, the adjustment component 116 can be considered as operatively coupled to the learning component 108 and relationship database 206. The term "variable threshold value" is used herein to refer to the strength of a relationship between one or more entities of semantic and/or time series data. This threshold value can be any manipulation, derivation, or direct representation of the distance between two or more vectors (representing semantic or time series data) in one or more multidimensional matrices comprising the relationship database. For the sake of demonstration, we can consider an example variable threshold value $R_1=2$ between the semantic entities "efficiency" and "heat" in power grid environment. If a defined criterion denotes that detection of a natural language message containing one or more elements with a variable threshold value $R_{1,2...N} \leq 3$ merits an advisory output 404, the system can, for example, provide a live time series display of temperature in response to detection of a natural language message " . . . loss of efficiency in transformer x in this weather". Based on other relationships and their variable threshold values therein, the prediction component 106 may provide added time series displays such as current readings (in amperes). This rudimentary evaluation is meant to merely serve as an example illustration of a possible use and comparison of a variable threshold relationship.

It is to be appreciated that the data analysis component 104, prediction component 106, learning component 108, and/or adjustment component 116 can perform a database generation process, a relationship establishment process and/or a machine learning process associated with semantic and time series data that cannot be performed by a human (e.g., is greater than the capability of a single human mind). For example, an amount data processed, a speed of processing of data and/or data types of data processed by the data analysis component 104, prediction component 106, learning component 108, and adjustment component 116 over a certain period of time can be greater, faster and different than an amount, speed and data type that can be processed by a single human mind over the same period of time. The data analysis component 104, prediction component 106, learning component 108, and adjustment component 116 can also be fully operational towards performing one or more other functions (e.g., fully powered on, fully executed, etc.) while also performing the above-referenced database generation process, advisory output generation process, relationship threshold adjustment process and/or machine learning process. Moreover, data analysis component 104, prediction component 106, learning component 108, and adjustment component 116 can include information that is impossible to obtain manually by a user. For example, an amount of information included in the advisory output 404 generated by the prediction component 106 and/or a variety of information included in the advisory output 404 can be more complex than information obtained manually by a user.

Figure 2:
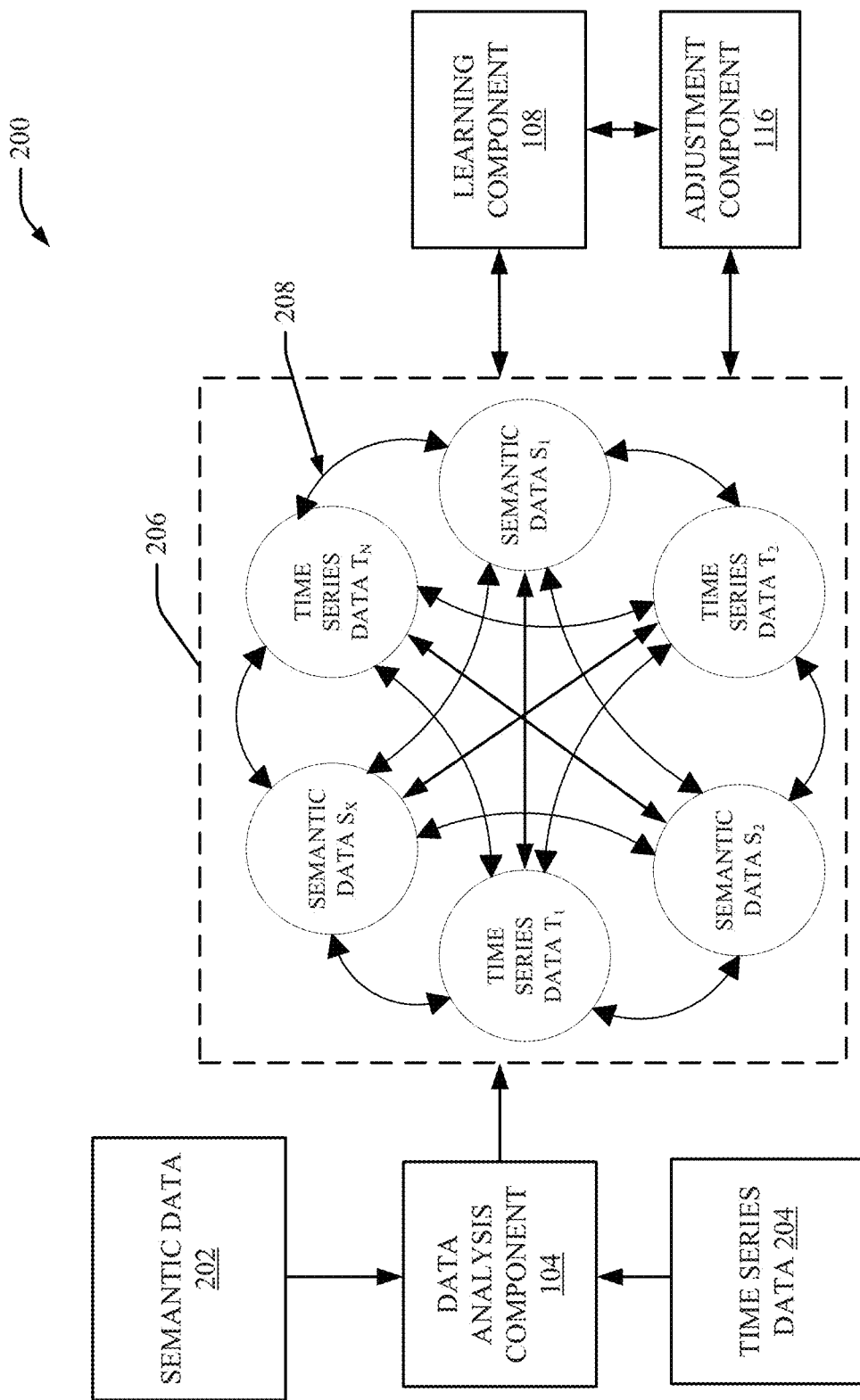
FIG. 2 illustrates a block diagram of an example, non-limiting system that can facilitate relationship database generation in accordance with one or more embodiments described herein.

FIG. 2 illustrates a block diagram of an example, non-limiting system that can facilitate relationship database generation in accordance with one or more embodiments described herein. Repetitive description of like elements employed in other embodiments described herein may be omitted for sake of brevity.

The system 200 includes the data analysis component 104. The data analysis component 104 can receive the semantic data 202 and the time series data 204. The time series data 204 can include different streams of time series data with equal time spans and/or unequal time spans. The semantic data 202 can be any semantic entity either previously integrated from the semantic data model 414 or entity otherwise detected whilst monitoring semantic inputs from the environment of implementation. Based on the received time series data 204 and semantic data 202, the data analysis component 104 can generate a relationship between, for example, time series data $T_1$ and one or more X elements of semantic data to train relationship database 206. Element 208 denotes a variable threshold value of a relationship established between example entities of time series data $T_N$ and semantic data $S_X$. The relationship database 206 can include semantic and time series data formatted as a multidimensional matrix of digital data. In an aspect, data associated with the relationship database 206 can be related to a set of users (e.g., a set of user identities), user devices, a set of ratings, a set of items, a set of words, a set of topics, a set of documents, a set of parameterized functions, a set of logged responses, selected or rejected advisory outputs 404 generated by prediction component 106, a set of prescribed services, a set of other items, and/or a set of other data. In one or more embodiments of the subject disclosure, the associated user data can be used to draw conclusions regarding satisfaction of one or more defined criteria against which a generated advisory output 404 is measured. For example, consider an advisory output 404 in the form of a diagnosis of mitral valve disorder in response to natural language trigger event comprising phrases mentioning symptoms such as "shortness of breath, appendage pain, fluid retention, and irregular heartbeat". Lack of satisfaction of a defined criterion can come in the form of data related to a set of users (e.g., rejection of the diagnosis by a user in favor of another condition, such as pregnancy or diabetes).

A learning component 108 that can define variable threshold value 208 of a relationship is operatively coupled to an adjustment component 116. The adjustment component can adjust a variable threshold value 208 of a relationship based upon the determining of the relationship by the learning component 108. The aforementioned determination can be based on information indicative of the level of satisfaction of a defined criterion. As detailed above, this information, or relative measure of accuracy, can include one or more associated user data in various forms (e.g., rejection of advisory output 404, partial rejection of advisory output 404, acceptance of advisory output 404, of acceptance of advisory output 404 with supplementary user prescribed actions).

Figure 3:
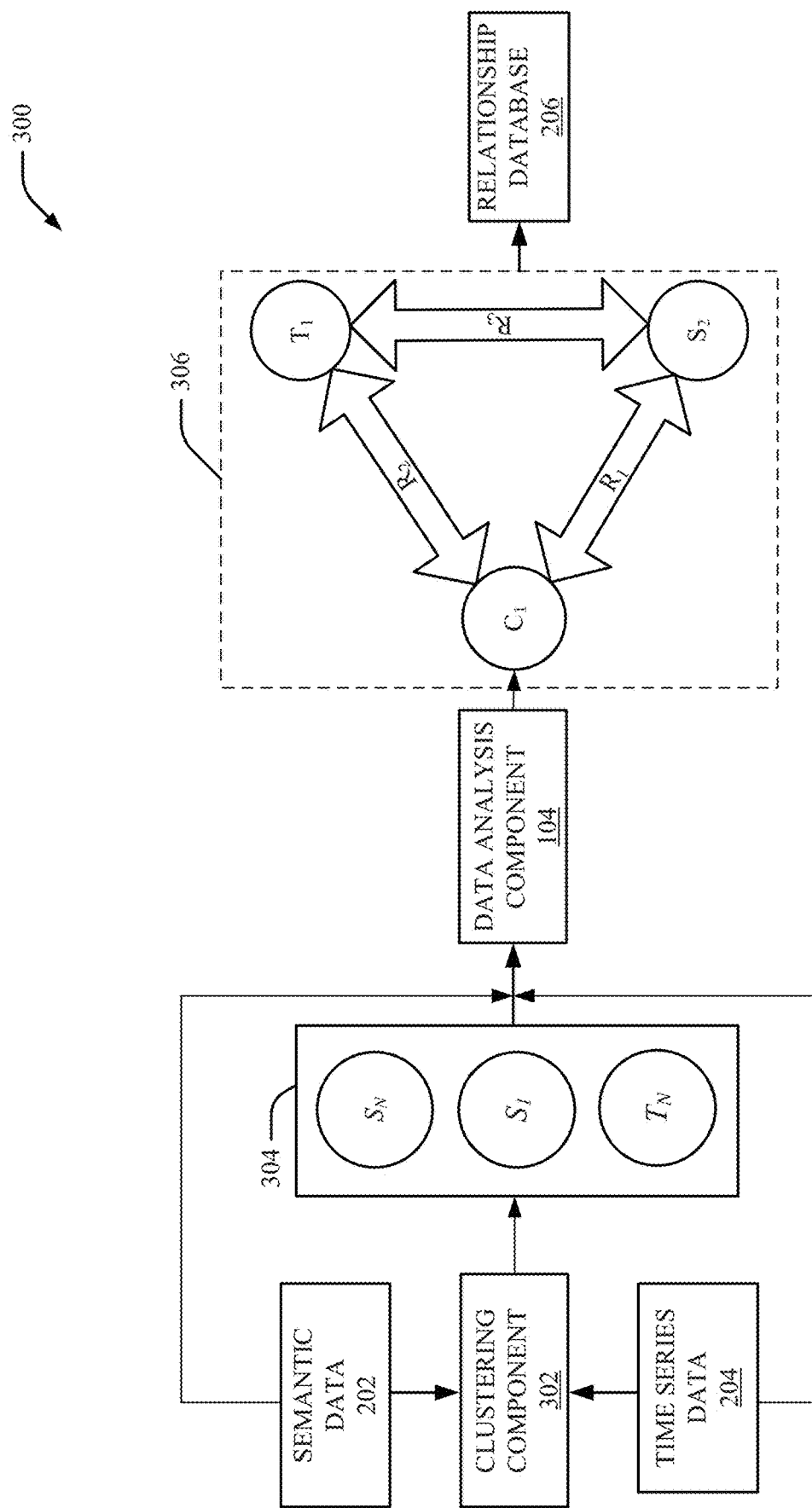
FIG. 3 illustrates a block diagram of an example, non-limiting system that can facilitate data cluster formation in accordance with one or more embodiments described herein.

FIG. 3. is a block diagram of an example, non-limiting system 300 highlighting a series of acts pertaining to the facilitating of grouping, by the system 300, of one or more entities of semantic or time series data. Repetitive description of like elements employed in other embodiments described herein may be omitted for sake of brevity.

In an embodiment, the relationship database 206 can be a multidimensional matrix that includes relationships between data of the time series data 204, semantic data 202, and groupings of entities derived from one or both sources. In the example provided, the grouping of elements $S_X$, $T_N$, and $S_1$ comprise cluster 304, which can be received by the data analysis component 104 and assigned a single vector space by the data analysis component 104 for the establishment of a relationship between cluster 304 and one or more entities of semantic or time series data.

Clustering component 302 can receive one or more streams of time series data from time series data 204. Entities derived from streams comprising time series data 204 can be from multiple streams at different times where the length of time the stream is received can differ in length. For example, if in a manufacturing environment, a product changeover that requires a physical difference in system configuration initiates the receiving of data by a sensor that would have otherwise been idle, this new stream can partially comprise time series data 204. As such, a time series entity $T_N$ grouped into cluster 304 by the clustering component 302 could be derived from a differing span of time series than, for example, time series entity $T_1$ utilized in element 306.

Data block 306 illustrates one or more relationships established by the data analysis component 104 wherein the relationships can be between one or more clusters grouped by the clustering component 302, and example entities of time series and semantic data $T_1$ and $S_2$, respectively. Similar to the variable threshold value 208 of a relationship utilized in FIG. 2, $R_1$, $R_2$, and $R_3$ can be used to represent one or more relationships generated by the. In one or more embodiments, $R_1$, $R_2$, and $R_3$ can be determined by the learning component and adjusted by the adjustment component based upon information indicative of satisfaction of a defined criterion. Entity subset 306 can partially comprise relationship database 206, comprised, additionally, of a plurality of semantic and time series entities and the respective relationships between those entities.

Figure 4:
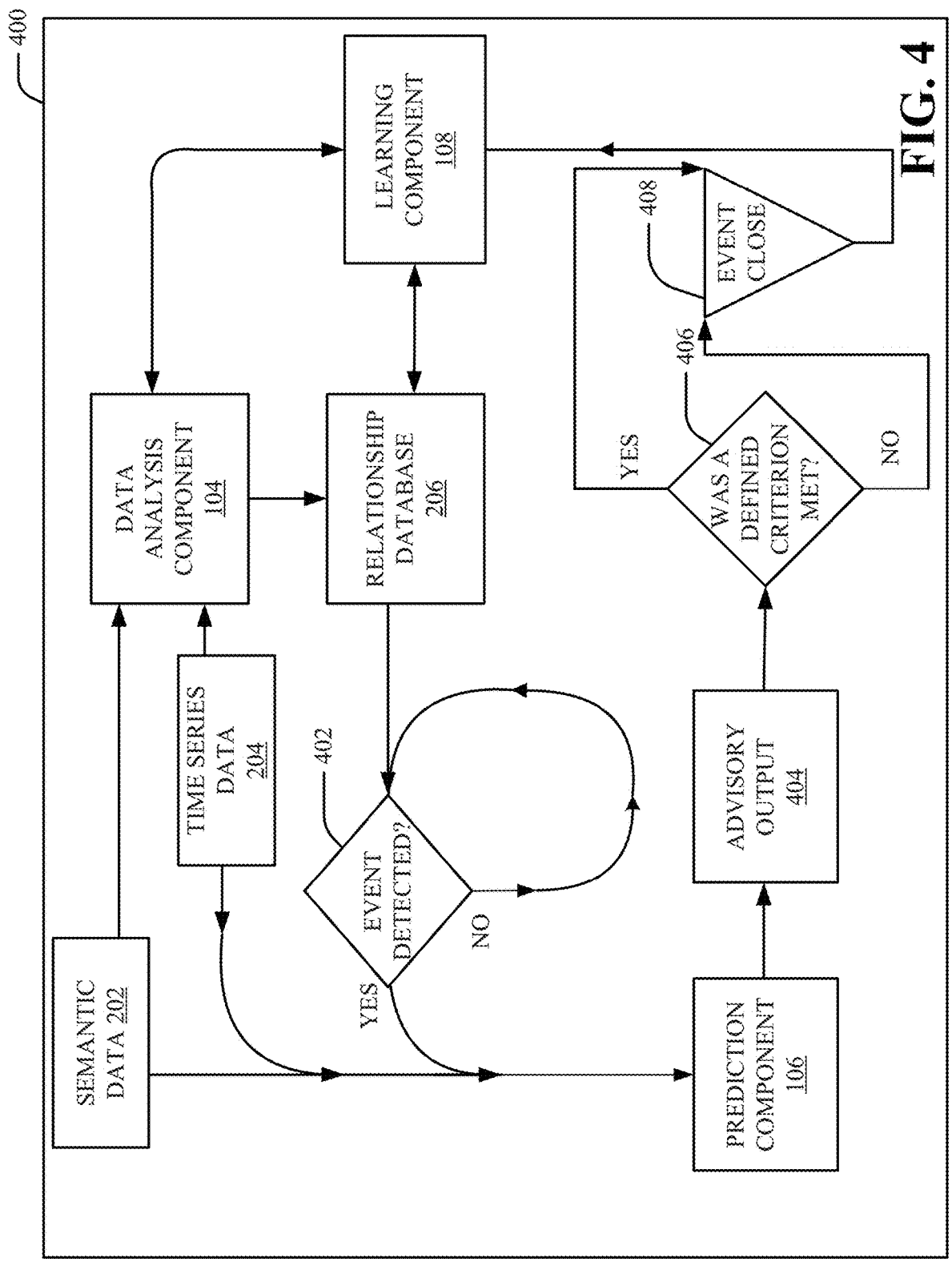
FIG. 4 illustrates a block diagram of an example, non-limiting system that can facilitate trigger event detection and subsequent potential acts in accordance with one or more embodiments described herein.

FIG. 4 illustrates an example, non-limiting system 400 as a series of acts that can facilitate machine learning processes using semantic data and time series data. Repetitive description of like elements employed in other embodiments described herein may be omitted for sake of brevity.

Semantic data 202 can be comprised of entities derived from the external operating environment, or entities previously trained on an existing semantic data model. The semantic data 202 can be received by the data analysis component for the establishment of relationships in relationship database 206. The semantic data 202 may also be received by the prediction component 106 as an example trigger event resulting in generating of an advisory output 404. Time series data 204 can be similarly received by data analysis component 104 or prediction component 106 to prompt generating an advisory output 404 by the prediction component 106. Data from blocks 202 and 204 analyzed by the data analysis component result in the subsequent generating of relationships by the data analysis component 104. Using the relationships generated in the relationship database 206 by the data analysis component 104, the prediction component 106 can monitor a corpus of semantic data that can partially comprise semantic data 202 for various trigger events described later in more detail. Prediction component 106 can also monitor one or more streams of time series data which can partially comprise time series data 204 for one or more entities of time series determined to be anomalous, resulting in subsequent generating of an advisory output 404 by the prediction component 106.

Decision block 402 illustrates the act of monitoring, by the prediction component, input streams of time series data 204 and a corpus that partially comprises semantic data 202 for data constituting a trigger event. If no event is detected from either data source illustrated here, the prediction component can continue to monitor data for a qualifying trigger event. In either case where a trigger event is detected, the prompting generating of the advisory output 404 by the prediction component 106 (whether by anomalous time series entities or entities of semantic data), an evaluation is made in decision block 406 where the advisory output 404 is measured against one or more defined criterion. Input to this evaluation can be partially comprised of data related to a set of users in any manner as described previously, generally pertaining to mention made with respect to system 200.

Decision block 402 illustrates an act of evaluating input entities of semantic and time series data for a trigger event. In one or more embodiments, a trigger event can be detection by the prediction component 106 of time series data determined to be anomalous. The term "anomalous" in this context can be any level of deviation from an expected measurement. Inputs to this defined evaluation can be relationships in the relationship database 206 generated by data analysis component 104, in addition to data related to a set of users as previously described. Adjustments of the variable threshold value(s) 208 of a relationship in relationship database 206 can be based upon various inputs, one of which can be a newly determined variable threshold value by the learning component 108. This can be in response to newly formed data by the environment in which the system 400 is employed. This can also be in response to the degree of satisfaction of a defined criterion in decision block 406 whose defined criterion can partially be defined by data related to a set of users as previously described. Relevant input of either kind can affect the determined variable threshold value of a relationship against which characteristics of time series entity can be measured as a qualifying "anomalous" trigger event. The same feedback loop applies for evaluation of one or more instances of semantic data entities as qualifying trigger events.

In another embodiment, trigger events can be more explicitly defined. An error code, either trained by a pre-existing semantic data model 414, determined by the learning component 108 in response to, for example, the routine receipt of a natural language message, or defined by data related to a set of users can constitute a trigger event.

In yet another embodiment, a trigger event can be a natural language message containing one or more recognized semantic data entities. Whereas the learning by the system of this particular type of recognized trigger event mirrors, in method, the process detailed in the paragraph above, the degree to which each mechanism of system learning impacts this can vary to any degree.

Advisory output 404 can be generated by the prediction component 106 in response to a trigger event as detected in decision block 402 by the prediction component 106. In one or more embodiments, the advisory output can be one or more live or historical displays of time series data. For instance a natural language message containing "mitral valve disorder" in a given patient can prompt retrieval, by the prediction component 106, of a live display of that patient's EKG in addition to any historical segments of data where that waveform is found to be erratic or malformed.

The same example can be used to demonstrate another embodiment in which the advisory output 404 can be a generated work notification. In the case of this particular environment, a relevant example might be ordering a procedure for reinforcement of papillary muscles meant to contract the valve leaflets and prevent regurgitation of blood into the left atrium of the heart.

It is to be understood that underlying entities of time series or semantic data contained in patient charts and written records can be learned by the system when a correct output is generated. For instance, in approving the aforementioned example advisory output 404 in the form of a mitral valve procedure, the system can learn any prior indications made such as symptoms detailing water retention, swelling of any extremities, light headedness, shortness of breath while resting, and gradual loss of aerobic capability. Instances of these semantic entities comprising recognized elements of semantic data 202 would subsequently have their respective variable threshold values adjusted accordingly within the relationship database 206 by the adjustment component 116 per the determination made by the learning component 108 as a result of the satisfaction of a defined criterion within evaluation block 406.

Decision block 408 is a merge block which merely illustrates the eventual and alternating behavior of the learning component 108 in conjunction with the adjustment component 116. This process is described in greatest detail in review of FIG. 2 and FIG. 9 and for the sake of brevity, will be omitted here.

FIG. 4A is a block diagram illustrating a sequence of acts in an example, non-limiting system 410 pertaining to the process of semantic data learning. FIG. 4A is intended to illustrate in greater detail the series of acts that occurs between data analysis component 104 and relationship database 206 in FIG. 4. Additionally, it is meant to demonstrate one or more embodiments in which the system can match known entity types to newly detected entities via their (for semantic data, in this case) word vector values. Repetitive description of like elements employed in other embodiments described herein may be omitted for sake of brevity.

Beginning at 412 a model of semantic data can be built defining measurement types and associated entity types. An example neural-linguistic programming (NLP) algorithm is highlighted for determination of word vectors for known measurement identifiers and entity types. For the sake of illustration, if we consider the environment of a power supply plant, if a message is received by the system detailing "frequent loss of efficiency in a specific model of transformers in high heat", a threshold relationship can then be generated between the measurement type "temperature", a newly linked measurement identifier "heat", and an example entity "transformer". Additionally mention of "efficiency" could prompt the system to infer a relationship with regards to known characteristics of "transformers" and present a time-series display of "voltage" as an example advisory output. Prior to this advisory output generation, however, for the illustration of this example, these known measurement types, identifiers, and entities will be used to comprise a preliminary semantic data model.

According to an embodiment, this semantic data model can be adjusted at 416 in response to the criterion evaluation at 406 as illustrated and previously described in FIG. 4.

According to another embodiment, at 420 word vectors can be determined for semantic entities derived from a corpus/semantic data source(s) 418. These external semantic data sources derived from the operating environment can be comprised of written or spoken communication in the form of emails, instant messages, operator logs, production logs, patient logs, patient charts, electronic medical records, free-form comments in database entries, transcribed phone calls, transcribed teleconferences, paper versions of documents that can be translated by various forms of character recognition, or translations of those documents therein. In response to receipt of these semantic data entities, system 410 can determine word vectors of entities derived from the external semantic data source(s) 418. Upon determination of both groups of word vectors, the system makes a comparison at 422 matches vectors from either group by comparing similarities between vectors.

Figure 5:
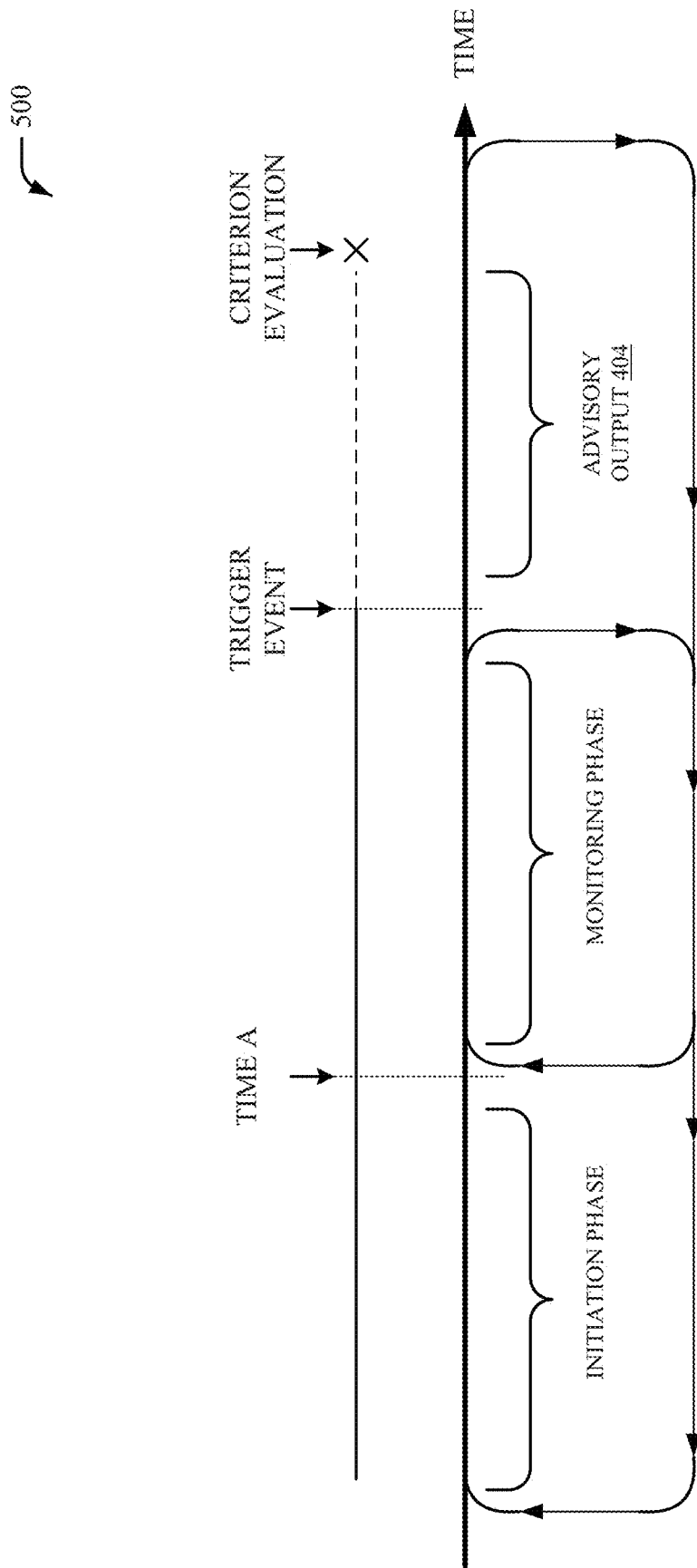
FIG. 5 illustrates an example, non-limiting system that can facilitate a machine learning process in accordance with one or more embodiments described herein.

FIG. 5 is a flow diagram illustrating example, non-limiting system 500 intended to further demonstrate the ability of the system to monitor, continually, one or more sources of semantic and/or time series data for natural language messages, alarms, anomalous measurements. Repetitive description of like elements employed in other embodiments described herein may be omitted for sake of brevity. A linear axis "TIME" is used to illustrate an example event detection wherein the system can detect a trigger event in accordance with one or more embodiments discussed herein. Also highlighted are the evaluation phases directly after and before receipt of a qualifying trigger event wherein both are measured against satisfaction of a defined criterion.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
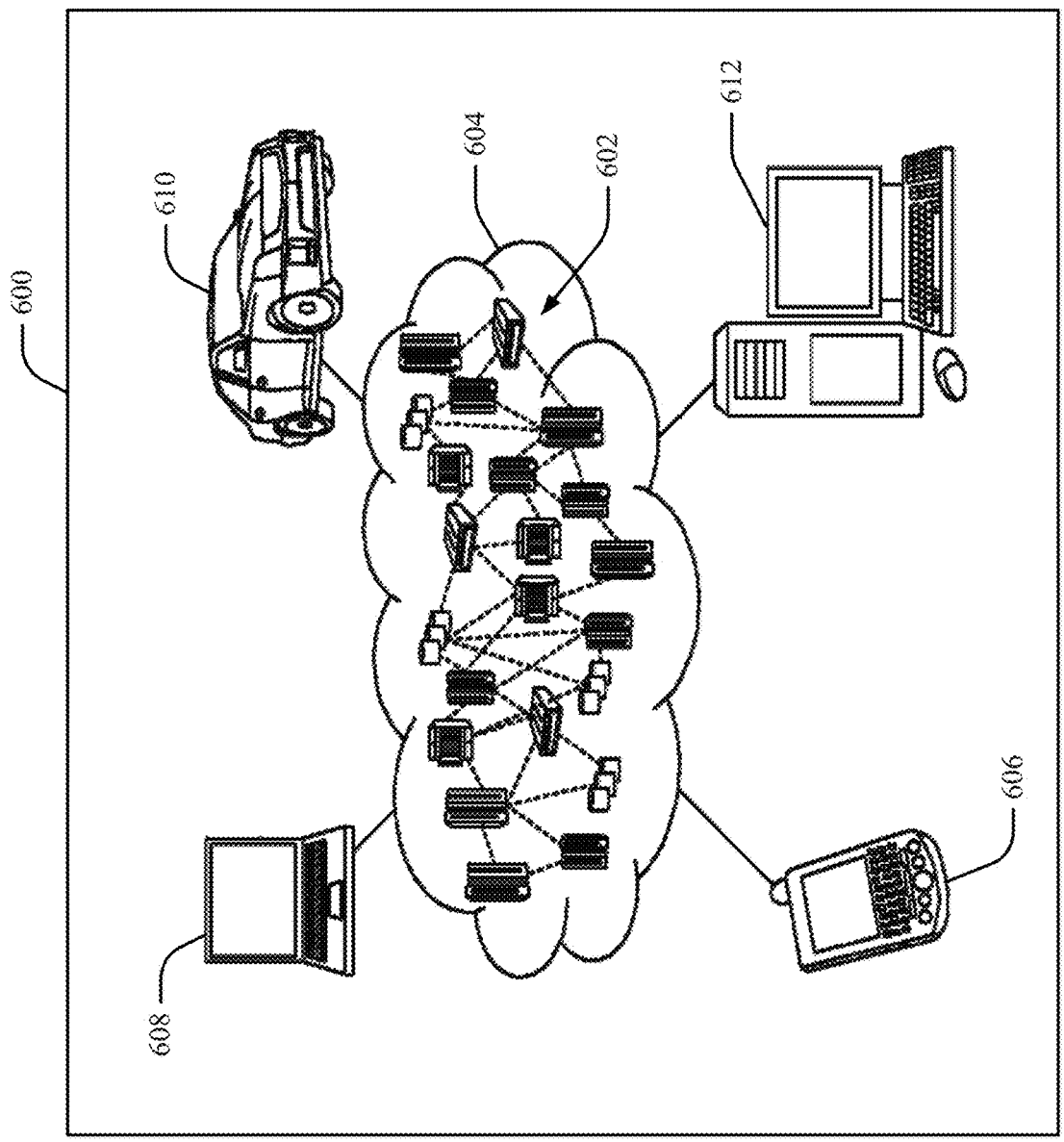
FIG. 6 depicts a cloud computing environment in accordance with one or more embodiments described herein.

Referring now to FIG. 6, an illustrative cloud computing environment 600 is depicted. As shown, cloud computing environment 604 includes one or more cloud computing nodes 602 with which local computing devices used by cloud consumers, such as, for example, personal digital assistant (PDA) or cellular telephone 606, desktop computer 612, laptop computer 608, and/or automobile computer system 610 may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604-N shown in FIG. 6 are intended to be illustrative only and that computing nodes 602 and cloud computing environment 600 can communicate with any type of computerized device over any type of network and/or network addressable connection (e.g., using a web browser).

Figure 7:
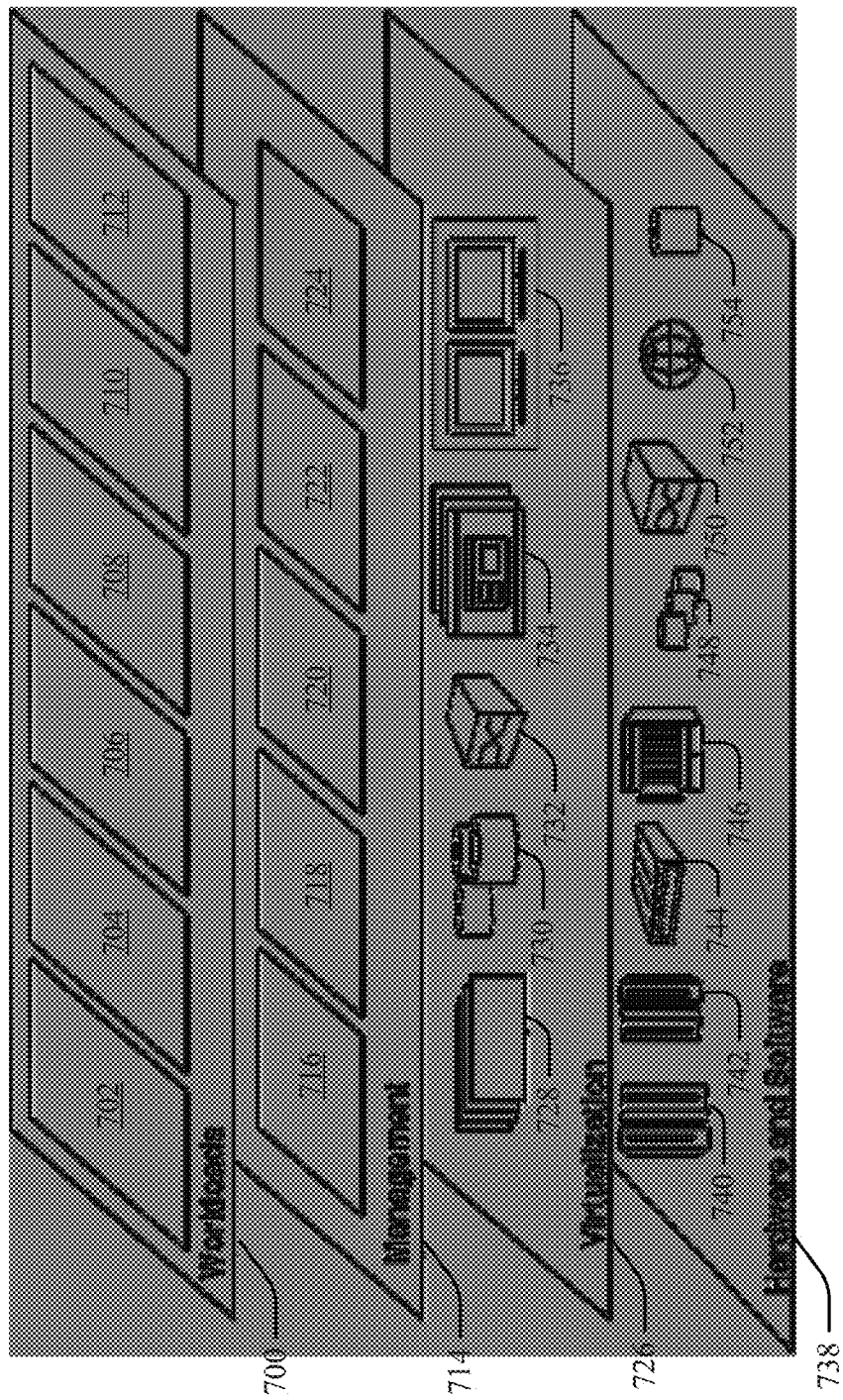
FIG. 7 depicts abstraction model layers in accordance with one or more embodiments described herein.

Referring now to FIG. 7, a set of functional abstraction layers provided by cloud computing environment 600 (FIG. 6) is shown. It should be understood in advance that the components, layers, and functions shown in FIG. 12 are intended to be illustrative only and embodiments of the invention are not limited thereto. As depicted, the following layers and corresponding functions are provided: Hardware and software layer 738 includes hardware and software components. Examples of hardware components include: mainframes 740; RISC (Reduced Instruction Set Computer) architecture based servers 742; servers 744; blade servers 746; storage devices 748; and networks and networking components 750. In some embodiments, software components include network application server software 752 and database software 754.

Virtualization layer 726 provides an abstraction layer from which the following examples of virtual entities may be provided: virtual servers 728; virtual storage 730; virtual networks 732, including virtual private networks; virtual applications and operating systems 734; and virtual clients 736.

In one example, management layer 714 may provide the functions described below. Resource provisioning 716 provides dynamic procurement of computing resources and other resources that are utilized to perform tasks within the cloud computing environment. Metering and Pricing 718 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 720 provides access to the cloud computing environment for consumers and system administrators. Service level management 722 provides cloud computing resource allocation and management such that required service levels are met. Service Level Agreement (SLA) planning and fulfillment 724 provide pre-arrangement for, the procurement of, cloud computing resources for which a future requirement is anticipated in accordance with an SLA.

Workloads layer 700 provides examples of functionality for which the cloud computing environment may be utilized. Examples of workloads and functions which may be provided from this layer include: mapping and navigation 702; software development and lifecycle management 704; virtual classroom education delivery 706; data analytics processing 708; transaction processing 710; and estimating node processing capacity values for order fulfillment 712.

Figure 8:
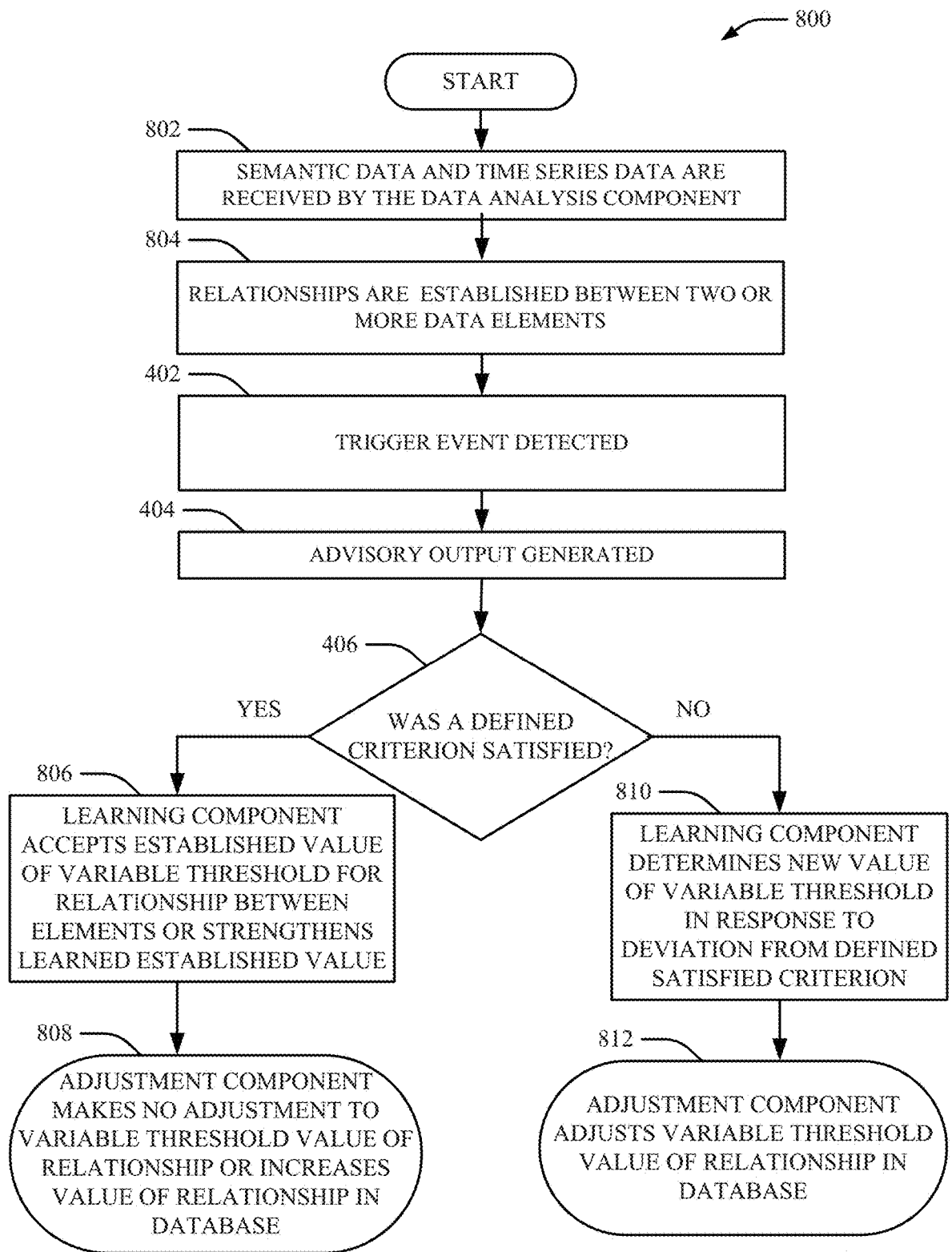
FIG. 8 illustrates a flow diagram of an example, non-limiting computer-implemented method that can facilitate machine learning using semantic and time series data in accordance with one or more embodiments described herein.

FIG. 8 is a block diagram describing a series of acts performed by an example, non-limiting system 800 illustrating the facilitating, by the system 800, of variable threshold value adjustment of entity relationships based upon satisfaction of a defined criterion. System 800 is featured, in part, to further illustrate processes that take place represented in FIG. 4 as merge block 408. For the sake of brevity, elements described in detail leading up to those processes being expanded upon will be omitted. At 802, semantic and time series data can be received by the data analysis component 104. At 804, the data analysis component 104 then can establish relationships between one or more elements or groups of elements of semantic or time series data. At 402, the prediction component 106 can detect a trigger event from a corpus of semantic or time series data. At 404, an advisory output can be generated by the prediction component 106. At 406, an evaluation of an advisory output can be measured as satisfying one or more defined criteria (e.g., user related data evaluating accuracy of the provided advisory output). If the criterion is satisfied, at 806 the learning component 108 accepts existing variable threshold value of a relationship or determines a new value. Subsequently, at 808 the adjustment component 116 either makes no adjustment to the variable threshold value or, based upon the determination, strengthens it, effectively closing, by some distance, the space between vectors for the relevant entities in the one or more multidimensional matrices that can comprise the relationship database. At 810, if the advisory output is found to not satisfy a defined criterion, the learning component can determine a new variable threshold value for the relationship of relevant data entities in the relationship database. Accordingly, at 812 the adjustment component will lower the threshold relationship between aforementioned entities in the relationship database.

Though the acts further illustrating criterion measurement in FIG. 8 are displayed as a terminating series of acts, it is to be understood that because the terminal acts effectively update relationships in the relationship database, those acts, in turn cascade to the determination of qualifying trigger events and subsequent generation of advisory outputs and criterion evaluation.

Figure 9:
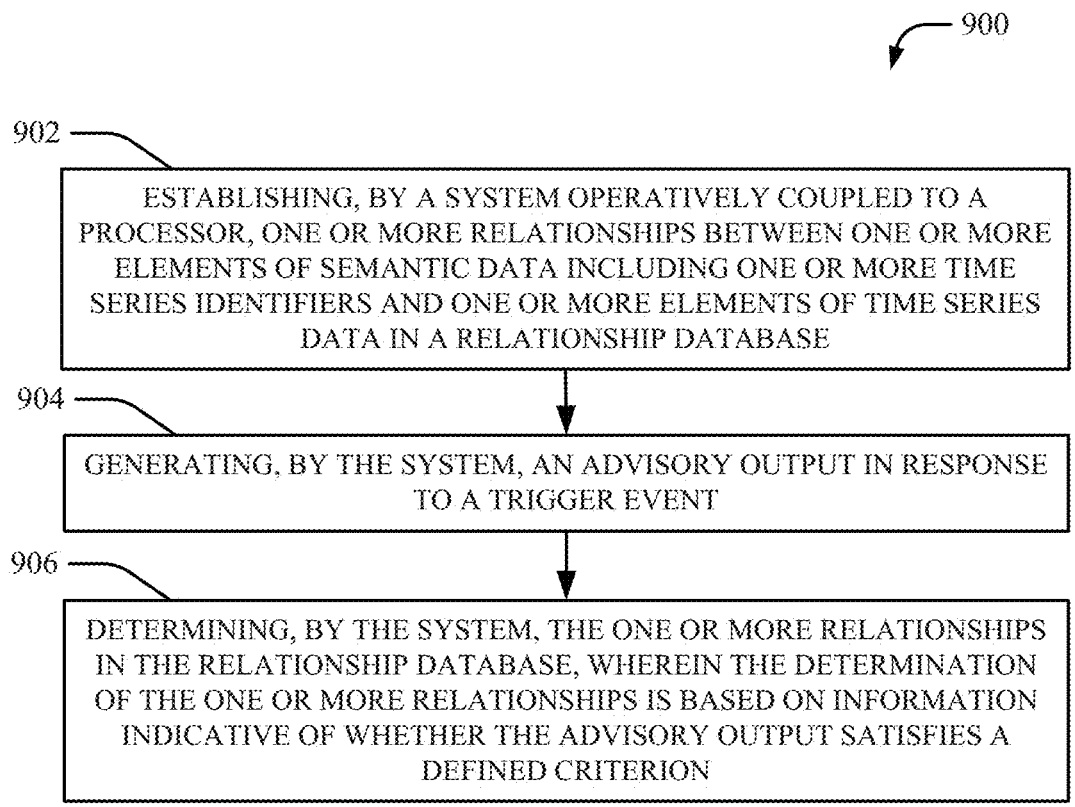
FIG. 9 illustrates a flow diagram of yet another example, non-limiting computer-implemented method that can facilitate machine learning using semantic and time series data in accordance with one or more embodiments described herein.

FIG. 9 illustrates a flow diagram of an example, non-limiting computer-implemented method 900 that can facilitate machine learning using time series data and semantic data in accordance with one or more embodiments described herein. At 902, one or more relationships is established (e.g., between one or more elements of semantic data including one or more time series identifiers and one or more elements of time series data) in a relationship database. At 904 an advisory output (e.g., one or more live or historical displays of time series data, or a work notification) is generated in response to a trigger event (e.g., an element of semantic data in the form of a natural language message, error code, or time series data determined to be anomalous). At 906, one or more relationships in the relationship database is determined based on information indicative of whether the advisory output satisfies a defined criterion.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
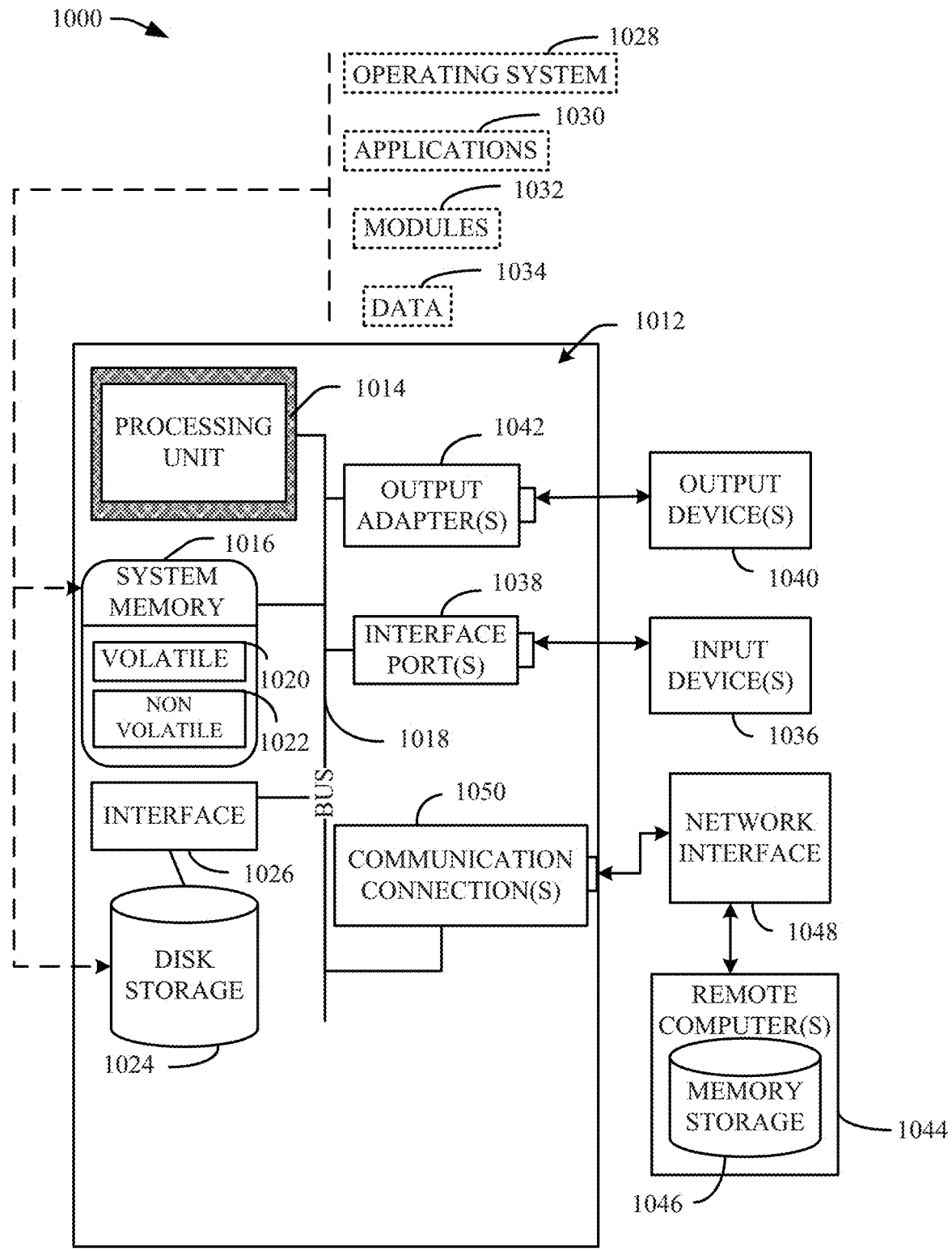
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. This functionality with regards to order of execution will not always be explicitly indicated, but rather illustrated as a primary indication of functionality that is not to be understood as wholly comprehensive. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts. The electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
      an analysis component that establishes one or more relationships between one or more elements of semantic data, including one or more time series identifiers, and one or more elements of time series data in a relationship database;
      a prediction component that generates one or more advisory outputs, wherein generation of the one or more advisory outputs is performed in response to a trigger event; and
      a learning component that determines the one or more relationships in the relationship database, wherein determination of the one or more relationships is based on information indicative of whether the one or more advisory outputs satisfy a defined criterion; and
      an adjustment component that adjusts a variable threshold value of the one or more relationships in the relationship database based on the defined criterion, wherein the variable threshold value is a representation of a distance between two or more vectors representing semantic entities or time series data in one or more multidimensional matrices comprising the relationship database, wherein the semantic entities are in a power grid environment,
         wherein based on a determination that the one or more advisory outputs satisfy the defined criterion, the system displays a live time series display of temperature in response to a natural language message regarding a defined weather event, and the prediction component outputs time series displays of readings of current.

2. The system of claim 1, wherein the adjustment component also updates the relationship database with the adjusted variable threshold value of the one or more relationships.

3. The system of claim 1, wherein the trigger event comprises an error code.

4. The system of claim 1, wherein the trigger event comprises detection of time series data determined to be anomalous.

5. The system of claim 1, wherein the trigger event comprises receipt of a natural language message.

6. The system of claim 1, wherein the one or more advisory outputs comprises one or more displays of live time-series data or historical time-series data.

7. The system of claim 1, wherein the one or more advisory outputs comprises a generated work notification.

8. The system of claim 1, wherein the prediction component monitors a corpus of the semantic data and the time series data for the trigger event.

9. The system of claim 1, further comprising a clustering component that combines two or more elements of the time series data or of semantic data into respective clusters for evaluation by the analysis component.

* * * * *